US012573005B2

(12) United States Patent
Su et al.

(10) Patent No.: US 12,573,005 B2
(45) Date of Patent: Mar. 10, 2026

(54) METHOD FOR ACQUIRING IMAGE USING IMAGE ACQUIRING SYSTEM

(71) Applicant: InnoLux Corporation, Miao-Li County (TW)

(72) Inventors: Jia-Hong Su, Miao-Li County (TW); Chong-Lin Huang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 167 days.

(21) Appl. No.: 18/523,039

(22) Filed: Nov. 29, 2023

(65) Prior Publication Data

US 2024/0221123 A1 Jul. 4, 2024

(30) Foreign Application Priority Data

Dec. 29, 2022 (CN) .......................... 202211743241.6

(51) Int. Cl.
| | |
|---|---|
| *G06T 5/50* | (2006.01) |
| *G02B 21/24* | (2006.01) |
| *G02B 21/26* | (2006.01) |
| *G06T 5/20* | (2006.01) |
| *G06T 5/94* | (2024.01) |
| *H04N 23/56* | (2023.01) |

(52) U.S. Cl.
CPC .............. *G06T 5/50* (2013.01); *G02B 21/241* (2013.01); *G02B 21/26* (2013.01); *G06T 5/20* (2013.01); *G06T 5/94* (2024.01); *H04N 23/56* (2023.01); *G06T 2207/10056* (2013.01); *G06T 2207/20212* (2013.01)

(58) Field of Classification Search
CPC .... G06T 5/50; G06T 5/20; G06T 5/94; G06T 2207/10056; G06T 2207/20212; G06T 2207/20221; G02B 21/241; G02B 21/26; G02B 21/367; H04N 23/56
See application file for complete search history.

(56) References Cited

U.S. PATENT DOCUMENTS

| | | | | |
|---|---|---|---|---|
| 2001/0002216 A1* | 5/2001 | Chuang | ..................... | G06T 5/50 |
| | | | | 382/284 |
| 2007/0069106 A1* | 3/2007 | Krief | ......................... | G06T 5/50 |
| | | | | 250/201.3 |

(Continued)

FOREIGN PATENT DOCUMENTS

| | | | | |
|---|---|---|---|---|
| CN | 106709896 A | 5/2017 | | |
| CN | 112712485 A | 4/2021 | | |
| WO | WO-2023102724 A1 * | 6/2023 | ........... | G06V 10/803 |

*Primary Examiner* — Richard A Hansell, Jr.
(74) *Attorney, Agent, or Firm* — MUNCY, GEISSLER, OLDS & LOWE, P.C.

(57) ABSTRACT

In a method for acquiring image using an image acquiring system, a first image data at a first position is acquired in a first direction of the image acquiring system, wherein the first image data corresponds to a plurality of pixel positions and includes a plurality of first sub-image data; a second image data at a second position is acquired in the first direction, wherein the second image data corresponds to the plurality of pixel positions and includes a plurality of second sub-image data; a larger value among values of the first sub-image data and the second sub-image data corresponding to one of the plurality of pixel positions is selected as a combination sub-image data of a combination image data.

18 Claims, 7 Drawing Sheets

(56) References Cited

U.S. PATENT DOCUMENTS

| | | | | |
|---|---|---|---|---|
| 2010/0272333 | A1* | 10/2010 | Stephan | G06T 7/0012 |
| | | | | 382/128 |
| 2014/0009595 | A1* | 1/2014 | Uchiyama | G02B 21/362 |
| | | | | 348/79 |
| 2022/0148143 | A1* | 5/2022 | Peng | G06T 7/13 |
| 2023/0260095 | A1* | 8/2023 | Su | G06T 5/20 |
| | | | | 382/173 |
| 2023/0267586 | A1* | 8/2023 | Wang | H04N 5/2628 |
| | | | | 382/159 |
| 2024/0127403 | A1* | 4/2024 | Wu | G06V 10/60 |

* cited by examiner stage moves in first horizontal direction and/or second horizontal direction; target object is aligned with image acquiring device —S21 camera module and lens in image acquiring device move in vertical direction to adjust focus of image acquiring device —S22 image acquiring device captures a plurality of images at different focuses —S23

〈 Image combination procedure 〉

51

| | 255 | 255 | 0 | 0 | 0 | 0 | 0 |
|---|---|---|---|---|---|---|---|
| 255 | 255 P1 | 0 P2 | 0 P3 | 0 P4 | 0 P5 | 0 | |
| 0 | 0 P6 | 255 P7 | 0 P8 | 0 P9 | 0 P10 | 0 | |
| 0 | 0 P11 | 0 P12 | 255 P13 | 0 P14 | 0 P15 | 0 | |
| 0 | 0 P16 | 0 P17 | 0 P18 | 0 P19 | 0 P20 | 0 | |
| 0 | 0 P21 | 0 P22 | 0 P23 | 0 P24 | 0 P25 | 0 | |
| 0 | 0 | 0 | 0 | 0 | 0 | 0 | |

FIG. 6

| 0 | 0 | 0 | 4 | 4 |
|---|---|---|---|---|
| 0 | 1 | 2 | 3 | 4 |
| 0 | 2 | 2 | 2 | 1 |
| 4 | 3 | 2 | 1 | 1 |
| 4 | 4 | 1 | 1 | 1 |

75

⇨

| 0 | 0 | 2 | 4 | 4 |
|---|---|---|---|---|
| 0 | 1 | 2 | 3 | 4 |
| 2 | 2 | 2 | 2 | 2 |
| 4 | 3 | 2 | 1 | 2 |
| 4 | 4 | 2 | 2 | 2 |

77

METHOD FOR ACQUIRING IMAGE USING IMAGE ACQUIRING SYSTEM

CROSS-REFERENCE TO RELATED APPLICATIONS

This application claims the benefits of the Chinese Patent Application Serial Number 202211743241.6, filed on Dec. 29, 2022, the subject matter of which is incorporated herein by reference.

BACKGROUND

Field of the Disclosure

The present disclosure relates to the technique of using an image acquiring system to acquire image.

Description of Related Art

High-magnification microscope lenses are often used to detect small objects, such as electronic components. When using a high-magnification microscope lens to capture images, the depth of field (that is, the focusing distance) is usually relatively shallow. For example, a 10× lens has a depth of field of about 3 micrometers (um), and a 20× lens has a depth of field of about 1.4 um. When photographing an object, if the thickness of the object is larger than the depth of field, part of the object in the photographed frame will be blurred so that a complete clear image cannot be presented. In other words, it may only capture a partial clear image. Therefore, the images captured by the existing technology are not suitable for use in detection or analysis.

Therefore, it is desirable to provide an improved image acquiring technique to mitigate and/or obviate the aforementioned problems.

SUMMARY

The present disclosure provides a method for acquiring an image using an image acquiring system, which comprises the steps of: in a first direction of the image acquiring system, acquiring a first image data at a first position, wherein the first image data includes a plurality of first sub-image data, and each of the first sub-image data corresponds to one of a plurality of pixel positions; in the first direction of the image acquiring system, acquiring a second image data at a second position, wherein the second image data includes a plurality of second sub-image data, and each of the second sub-image data corresponds to one of the plurality of pixel positions; and selecting a larger value among values of the first sub-image data and the second sub-image data corresponding to one of the plurality of pixel positions as a combination sub-image data in a combination image data.

Other novel features of the disclosure will become more apparent from the following detailed description when taken in conjunction with the accompanying drawings.

BRIEF DESCRIPTION OF DRAWINGS

FIG. 6 schematically illustrates gray scale value change calculation performed on one of the gray scale value distribution data of FIG. 5B;

DETAILED DESCRIPTION OF EMBODIMENT

Figure 1:
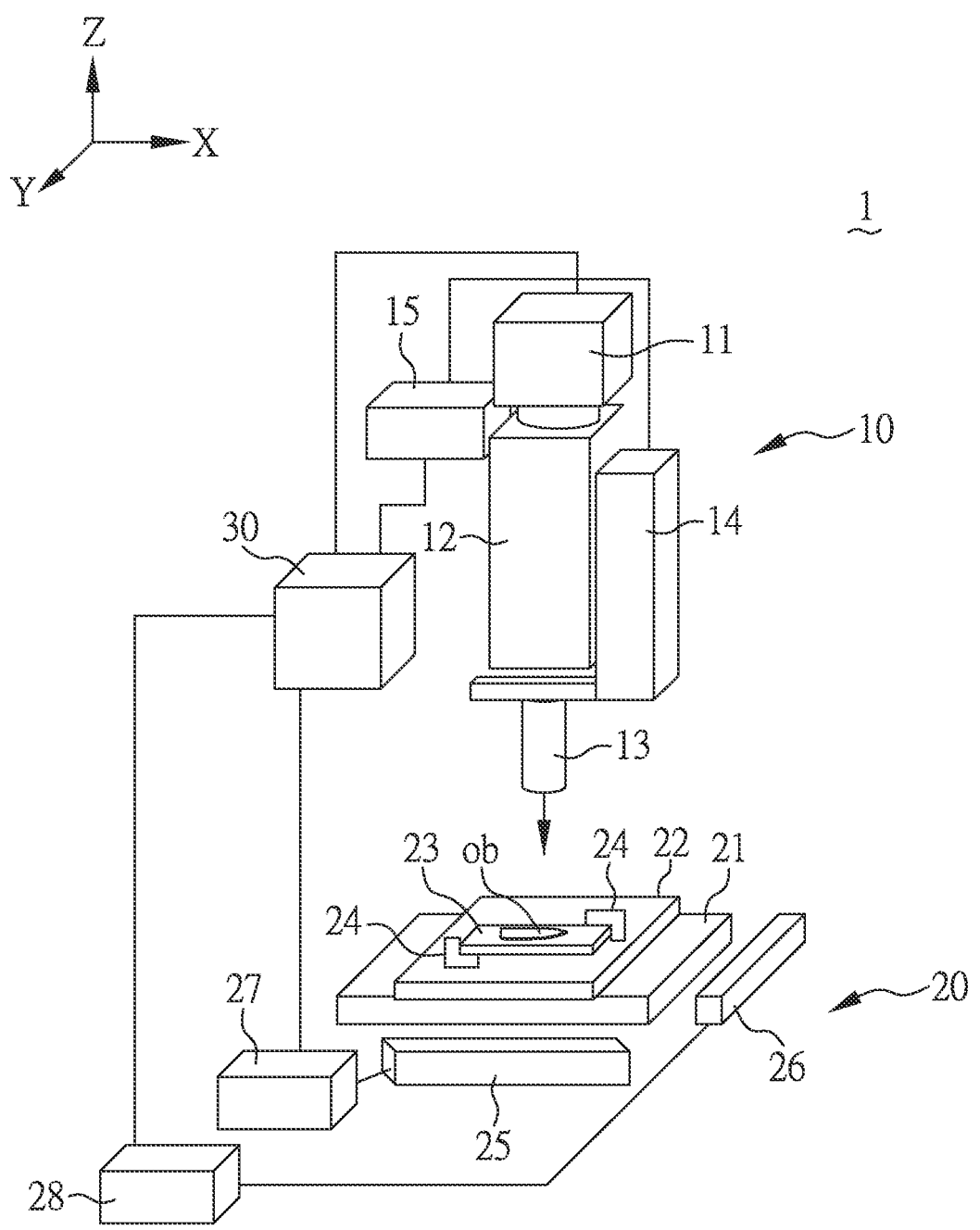
FIG. 1 is a schematic diagram of an image acquiring system according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "approximately" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the terms "the given range is from the first numerical value to the second numerical value" or "the given range falls within the range from the first numerical value to the second numerical value" indicates that the given range includes the first numerical value, the second numerical value, and other values therebetween.

In addition, the method disclosed in the present disclosure may be used in electronic devices, and the electronic devices may include imaging devices, assembling devices, display devices, backlight devices, antenna devices, sensing devices, tiled devices, touch display devices, curved display devices or free shape display devices, but not limited thereto. When the electronic device is an assembling device or a tiled device, the electronic device may include a grabbing mechanism, but not limited thereto. The electronic device may include, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but not limited thereto. The tiled device may be, for example, a display tiled device or an antenna tiled device, but not limited thereto. It should be noted that the electronic device may be any permutation and combination of the aforementioned, but not limited thereto. In addition, the electronic device may be a bendable or flexible electronic device. It should be noted that the electronic device may be any permutation and combination of the aforementioned, but not limited thereto. In addition, the shape of the electronic device may be rectangular, circular, polygonal, with curved edges, or other suitable shapes. The electronic device may have peripheral systems such as a drive system, a control system, a light source system, a shelf system, etc. to support a display device, an antenna device or a tiled device.

It should be noted that, in the following embodiments, without departing from the spirit of the present disclosure, the features in several different embodiments may be replaced, reorganized, and mixed to complete other embodiments. As long as the features of the various embodiments do not violate the spirit of the present disclosure or conflict with each other, they can be mixed and matched arbitrarily.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

In addition, the term "adjacent" in the specification and claims is used to describe mutual proximity, and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals.

For the convenience of description, the electronic device will be described below as the image acquiring device, but the present disclosure is not limited thereto. Hereinafter, the term "image" refers to photos and pictures that can be actually seen by human eyes, such as frames that can be presented on a display. The term "image data" refers to electronic files corresponding to photos or pictures, that is, files that can be processed or generated by a processor or computer. For example, the image data is captured by a camera module and input into a processor or computer, and the image is projected on the display.

FIG. 1 is a schematic diagram of an image acquiring system 1 according to an embodiment of the present disclosure. The image acquiring system 1 may be used to capture images so as to acquire image data. As shown in FIG. 1, the image acquiring system 1 may include an image acquiring device 10, a moving device 20 and a processing device 30.

The image acquiring device 10 may include a camera module 11, a lens body 12, a lens 13, a first shifter 14 and a first controller 15. In a vertical direction (e.g., Z direction), the camera module 11 and the lens 13 are disposed at opposite ends of the lens body 12, respectively. For example,

5 | 6 in FIG. 1, the camera module 11 is disposed above the lens body 12, and the lens 13 is disposed below the lens body 12, but it is not limited thereto. In one embodiment, the camera module 11 and the lens 13 may be in alignment in the Z direction, where "alignment" means that, for example, the projections of the camera module 11 and the lens 13 in the Z direction at least partially or completely overlap. The camera module 11 may capture images of objects below the lens 13 through the lens 13. The first shifter 14 may be connected to the lens body 12, wherein the first shifter 14 may be arranged to move in the Z direction so as to drive the camera module 11, the lens body 12 and the lens 13 to move in the Z direction, thereby adjusting the focus of the image acquiring device 10 to capture clear images. The first controller 15 is electrically connected to the first shifter 14 so as to control the first shifter 14 to move in the Z direction. In addition, the first controller 15 is electrically connected to the processing device 30, and receives signals from the processing device 30.

The moving device 20 may include a stage 21, a backlight 22, a second shifter 25, a third shifter 26, a second controller 27 and a third controller 28. In the Z direction, the backlight 22 may be disposed on the stage 21. A slide glass 23 may be used to carry at least one target object (ob) and may be placed on the backlight 22, and the backlight 22 may provide light toward the slide glass 23 to assist the image acquiring device 10 to capture images. In another embodiment, the moving device 20 may further include at least one resting member 24, and the resting member 24 may be disposed on the backlight 22 for fixing the slide glass 23. The stage 21 may be connected with the second shifter 25 and the third shifter 26. In one embodiment, the second shifter 25 may move in a first horizontal direction (e.g., X direction) relative to a fixed object (not shown, which may be, for example, a bracket), and the third shifter 26 may move in a second horizontal direction (e.g., Y direction) relative to a fixed object (not shown, which may be, for example, a bracket), so that the second shifter 25 and/or the third shifter 26 may drive the stage 21 to move in the X direction and/or the Y direction. The second controller 27 is electrically connected to the second shifter 25 to control the movement of the second shifter 25 in the X direction. The third controller 28 is electrically connected to the third shifter 26 to control the movement of the third shifter 26 in the Y direction. The second controller 27 and/or the third controller 28 may be electrically connected to the processing device 30. In addition, in one embodiment, the moving device 20 may further include a transparent layer (not shown), which may be disposed on the backlight 22, so that the light emitted by the backlight 22 may pass through the transparent layer for being transmitted to the glass slide 23 on which the target object (ob) is carried, thereby reducing the damage caused to the surface of the backlight 22 when the glass slide 23 is installed and/or removed. The material of the transparent layer may, for example, include polyimide (PI), polycarbonate (PC), polyethylene terephthalate (PET), poly(methyl methacrylate) (PMMA), rubber, acrylonitrile butadiene styrene (ABS), glass, other suitable materials, or a combination thereof, but it is not limited thereto.

The processing device 30 is an electronic device equipped with a microprocessor, such as a computer, a mobile phone, a notebook computer, a tablet computer, a cloud server, etc., while it is not limited thereto. In one embodiment, the processing device 30 may execute one or more computer program products stored in a non-transitory computer readable medium (such as but not limited to a memory) so as to realize the function of controlling the first shifter 14, the second shifter 25 and/or the third shifter 26, or realize the function of image processing, but the present disclosure is not limited thereto.

In addition, the first controller 15, the second controller 27 and the third controller 28 may be provided with various implementation aspects. In one embodiment, the second controller 27 and the third controller 28 may be electrically connected to each other, and one of the second controller 27 and the third controller 28 is electrically connected to the processing device 30. In one embodiment, the second controller 27 and the third controller 28 may be integrated together. In one embodiment, the first controller 15, the second controller 27 and the third controller 28 may be integrated together. The present disclosure is not limited thereto.

With the aforementioned arrangement, it is able to realize the method for acquiring image using the image acquiring system 1 disclosed in the present disclosure, which is hereinafter referred to as "image acquiring method". The image acquiring method may be executed through the image acquiring system 1, and includes the following: a first step in which a first image data at a first position is acquired in a first direction (e.g., Z direction) of the image acquiring system 1 (please refer to numeral 61 of FIG. 7A), where the first image data corresponds to a plurality of pixel positions (please refer to FIG. 7A, P1~P25 of numeral 61), and includes a plurality of first sub-image data; a second step in which a second image data at a second position is acquired in a first direction (e.g., Z direction) of the image acquiring system 1 (please refer to numeral 62 of FIG. 7A), where the second image data corresponds to the plurality of pixel positions (please refer to FIG. 7A, P1~P25 of numeral 62), and includes a plurality of second sub-image data; and a third step in which the larger one among the values of the first sub-image data and the second sub-image data corresponding to one of the plurality of pixel positions as a combination sub-image data in a combination image data (please refer to numeral 70 of FIG. 7B), where the combination image data includes a plurality of combination sub-image data. In one embodiment, the first image data and the second image data are image data corresponding to the same photographing location but different focuses. The first step and the second step may be realized by using the image acquiring device 10 and the moving device 20 to execute "an image capturing procedure" shown in FIG. 2, and the third step may be realized by using the processing device to execute "an image combination procedure" shown in FIG. 4.

Figure 2:
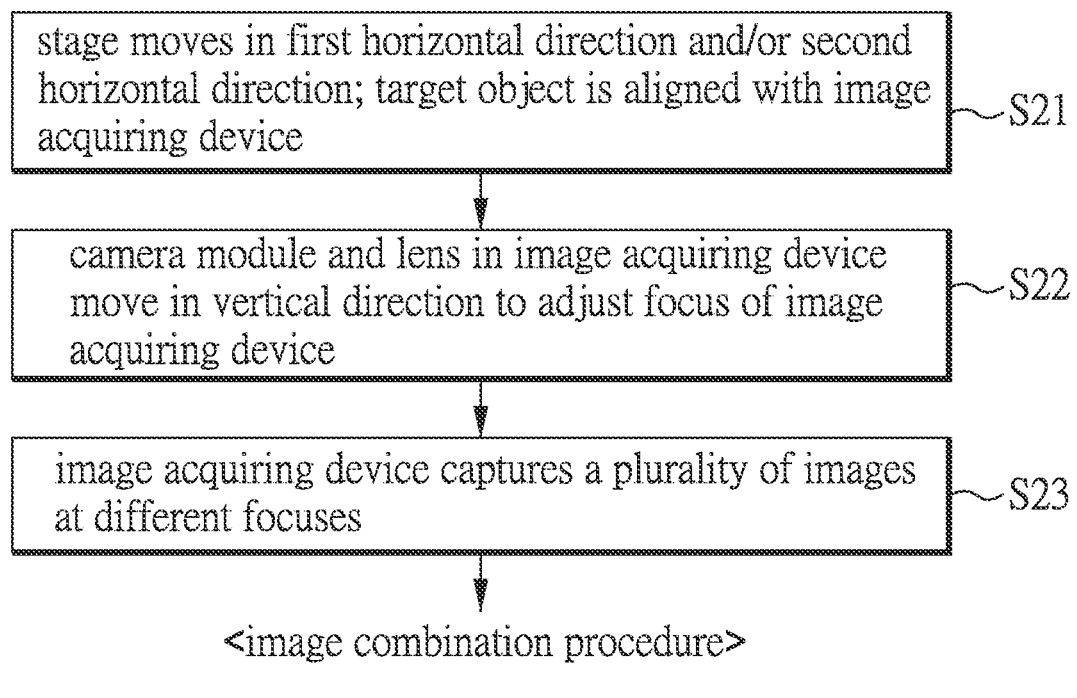
FIG. 2 is a flow chart illustrating steps of an image capturing procedure according to an embodiment of the present disclosure.

The "image capturing procedure" will be described first. FIG. 2 is a flow chart illustrating the steps of then image capturing procedure according to an embodiment of the present disclosure, and please refer to FIG. 1 at the same time.

First, step S21 is executed, in which the stage 21 moves in the first horizontal direction (X direction) and/or the second horizontal direction (Y direction), so that the target object (ob) is aligned with the image acquiring device 10. Then step S22 is executed, in which the camera module 11 and the lens 13 in the image acquiring device 10 move in the vertical direction (Z direction) to adjust the focus of the image acquiring device 10. Then, step S23 is executed, in which the image acquiring device 10 captures a plurality of images at different focuses.

Regarding step S21, in one embodiment, the processing device 30 may send a command to the second controller 27 and/or the third controller 28, and the second controller 27 and/or the third controller 28 may control the second shifter 25 and/or the third shifter 26 to move according to the command. The second shifter 25 and/or the third shifter 26 may drive the stage 21 to move, thereby making the target object (ob) on the glass slide 23 in alignment with the camera module 11 and the lens 13 in the Z direction, for example, at least partially overlapping in the Z direction, but it is not limited thereto.

Regarding step S22, in one embodiment, the processing device 30 may send a command to the first controller 15, and the first controller 15 may control the first shifter 14 to move in the Z direction. The first shifter 14 drives the lens body 12 to move in the Z direction, and then drives the camera module 11 and the lens 13 to move in the Z direction, thereby adjusting the focus of the image acquiring device 10.

Regarding step S23, in one embodiment, with the movement of the camera module 11 and the lens 13 in the Z direction, the image acquiring device 10 may capture multiple images of the same picture but at different focuses. As a result, the "image capturing procedure" can be completed.

Figure 3:
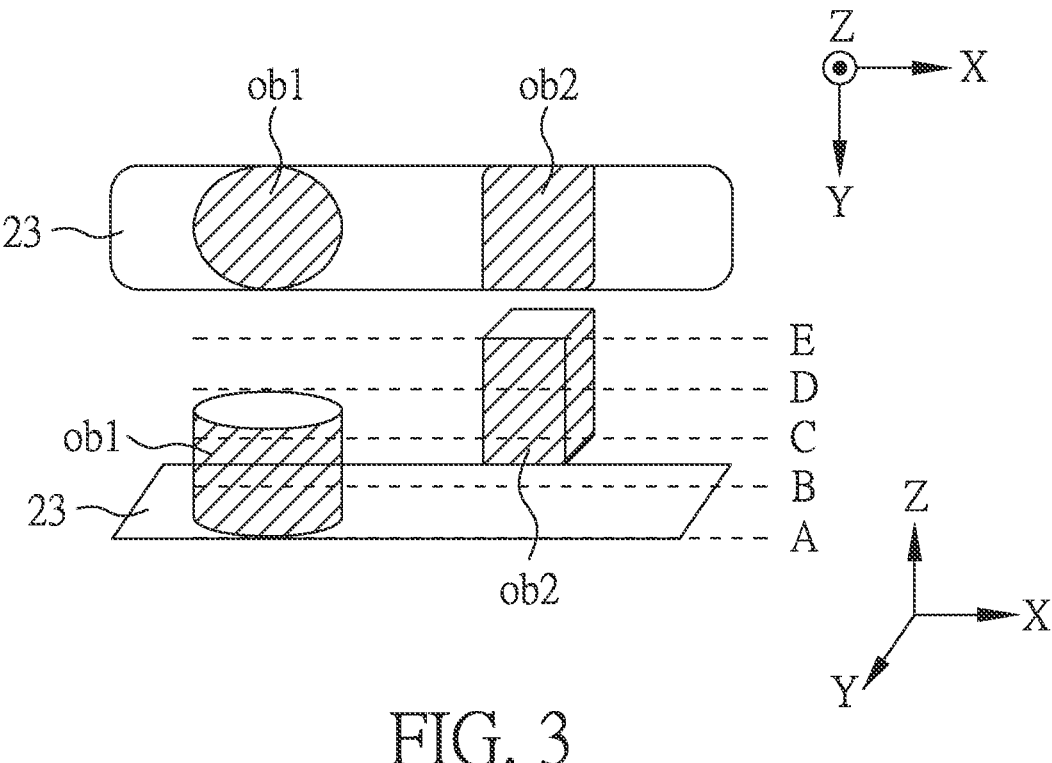
FIG. 3 shows a top view and a side view of two target objects according to an embodiment of the present disclosure.

Since the image acquiring device 10 performs image capturing at different focuses, each image captured by the image acquiring device 10 may only be partially clear, and the partially clear portion in each image may be different. The reason for partial clarity is described below by taking the embodiment of FIG. 3 as an example. FIG. 3 is a top view and a side view of the first object (ob1) and the second object (ob2) according to an embodiment of the present disclosure, wherein the upper portion is a top view and the lower portion is a side view.

As shown in the side view of the lower portion of FIG. 3, the first object (ob1) and the second object (ob2) are two objects to be detected. In one embodiment, the first object (ob1) and/or the second object (ob2) may be, for example, a cell sample placed in a liquid or an area of different heights in an electronic component, but the present disclosure is not limited thereto. Taking a cell sample as an example, the first object (ob1) and/or the second object (ob2) may be disposed at different heights in the liquid; for example, the first object (ob1) may be disposed between height A and height C, and the second object (ob2) may be disposed between height C and height E. In another embodiment, the first object (ob1) and/or the second object (ob2) may be, for example, two parts of the electronic component to be detected. Since the surface of the electronic component may have unevenness, the first object (ob1) and/or the second object (ob2) may be disposed at different heights. However, the present disclosure is not limited thereto. In other embodiments, the camera may also be used to photograph objects with different distances, but it is not limited thereto.

As shown in the top view of the upper portion of FIG. 3, when the focus of the image acquiring device 10 is adjusted to the corresponding height C, in the image captured by the image acquiring device 10, most area of the surface of the first object (ob1) may present a clear image, while most area of the surface of the second object (ob2) may present an unclear image. When the focus of the image acquiring device 10 is adjusted to correspond to the height E, in the image captured thereby, most area of the surface of the second object (ob2) may present a relatively clear image, while most area of the surface of the first object (ob1) may present an unclear image. Therefore, it can be seen that the multiple images captured by the image acquiring device 10 at different focuses may not be able to present the clear first object (ob1) and second object (ob2) at the same time. To solve this problem, the image acquiring system 1 of the present disclosure may execute an "image combination procedure".

Figure 4:
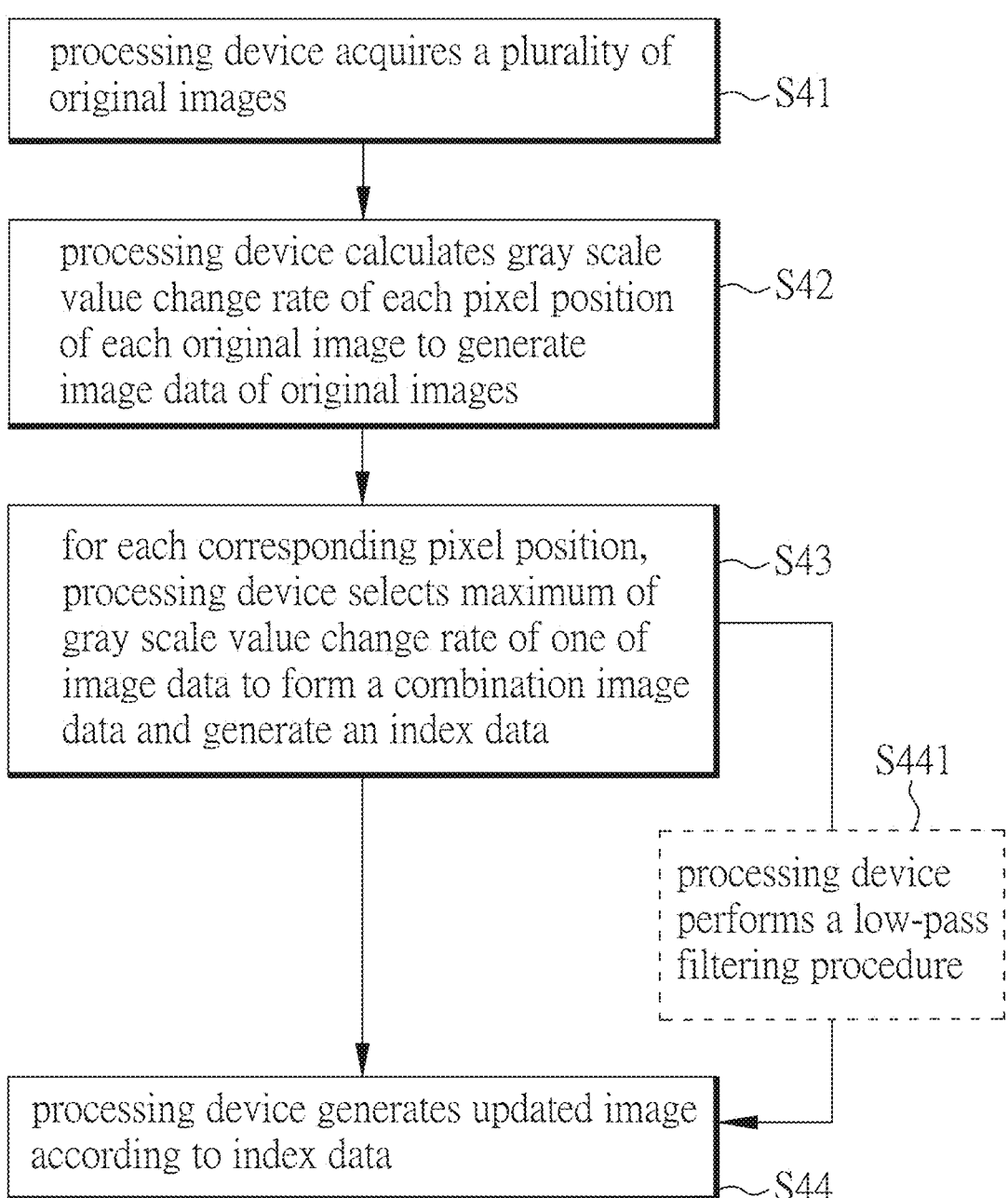
FIG. 4 is a flow chart illustrating steps of an image combination procedure according to an embodiment of the present disclosure.
Figures 7A, 7B:
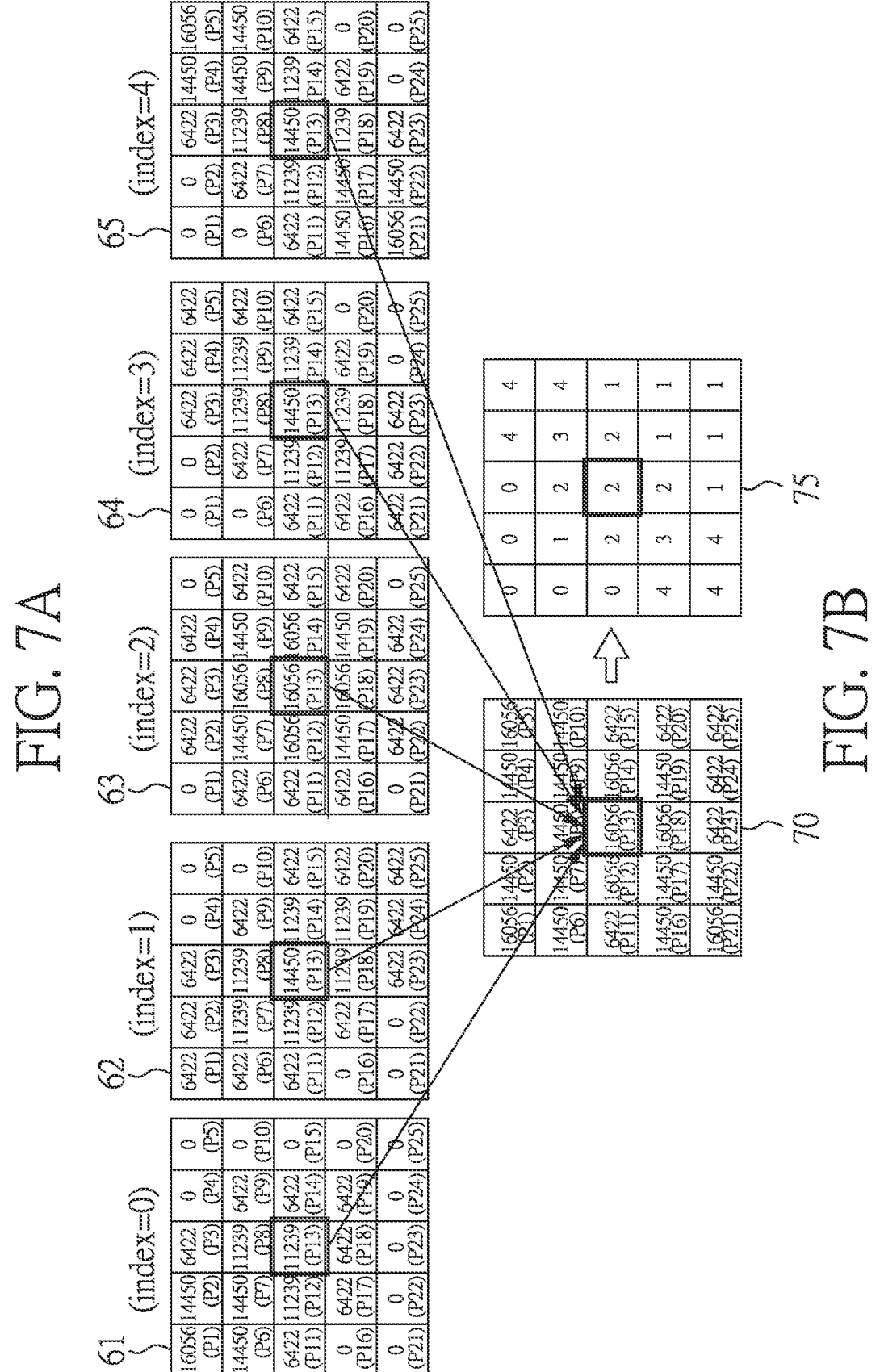
FIG. 7A schematically illustrates distribution of gray scale value change rates of pixel positions in the first original image to the fifth original image of FIG. 5A.
FIG. 7B schematically illustrates combination image data and index data generated according to distribution of gray scale value change rates of in FIG. 7A.
Figures 8, 9:
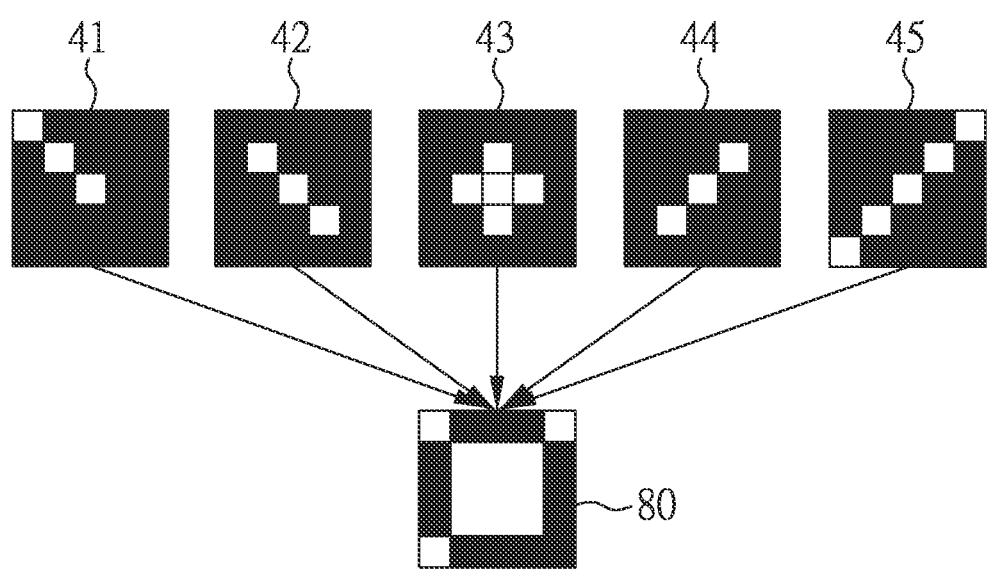
FIG. 8 is a schematic diagram of an updated image according to an embodiment of the present disclosure.
FIG. 9 schematically illustrates a de-noising procedure according to an embodiment of the present disclosure.

The "image combination procedure" is illustrated with FIG. 4 to FIG. 8, and please refer to FIG. 1 to FIG. 3 at the same time. FIG. 4 is a flow chart illustrating the steps of the image combination procedure according to an embodiment of the present disclosure. FIG. 5A is a schematic diagram of the first original image 41 to the fifth original image 45 according to an embodiment of the present disclosure, which are the images acquired by the image acquiring device 10 at different positions in the Z direction. FIG. 5B schematically illustrates gray scale value distribution data 51-55 of the first original image 41 to the fifth original image 45 of FIG. 5A. FIG. 6 schematically illustrates gray scale value change calculation performed on one of the gray scale value distribution data 51 of FIG. 5B. FIG. 7A schematically illustrates distribution of gray scale value change rates of pixel positions in the first original image 41 to the fifth original image 45 of FIG. 5A. FIG. 7B schematically illustrates combination image data 70 and index data 75 generated according to distribution of gray scale value change rates of in FIG. 7A. FIG. 8 is a schematic diagram of an updated image 80 according to an embodiment of the present disclosure. It is noted that, in the embodiment of FIG. 4 to FIG. 8, five images captured by the image acquiring device 10 at the same position (that is, at the same position in the plane of the X direction and the Y direction) and at different focuses are taken as an example, which are, for example, the images of different focuses of the second target object (ob2) shown in FIG. 3. In addition, each of the first original image 41 to the fifth original image 45 has 5 by 5 sub-images, and each sub-image corresponds to, for example, one of the pixel positions P1~P25, but the present disclosure is not limited thereto.

As shown in FIG. 4 to FIG. 8, step S41 is executed first, in which the processing device 30 acquires the first original image 41 to the fifth original image 45. The gray scale value distribution data of the first original image 41 to the fifth original image 45 may be inconsistent. Then, step S42 is executed, in which the processing device 30 calculates a gray scale value change rate of each sub-image of the first original image 41 to the fifth original image 45, so as to generate first image data 61 to fifth image data 65. The first image data 61 includes a plurality of first sub-image data, the second image data 62 includes a plurality of second sub-image data, the third image data 63 includes a plurality of third sub-image data, the fourth image data 64 includes a plurality of fourth sub-image data, the fifth image data 65 includes a plurality of fifth sub-image data, and each sub-image data corresponds to one of the pixel positions P1~P25. Then, step S43 is executed, in which, for each of the pixel positions, the processing device 30 selects the maximum value of the gray scale value change rate of one of the first sub-image data to fifth sub-image data so as to form a sub-data of the combination image data 70 (hereinafter referred to as combination sub-image data), and an index sub-data is generated according to the gray scale value change rates of the first sub-image data to the fifth sub-image data, wherein each index sub-data corresponds to one of the pixel positions P1~P25 and all index sub-data may be combined into index data 75 to record the index of which sub-image data is selected. Then, step S44 is executed, in which the processing device 30 generates an updated image 80 according to the index data 75; for example, according to the index data 75, the gray scale value change rate of the combination sub-image data of each pixel position P1~P25 in the combination image data 70 is converted into a gray scale value, thereby converting each combination sub-image data into an updated sub-image of the updated image 80. In addition, in one embodiment, a step S441 may also be executed between step S43 and step S44, and the processing device 30 may perform a low-pass filtering procedure; however, the step S441 may not be executed.

Figures 5A, 5B:
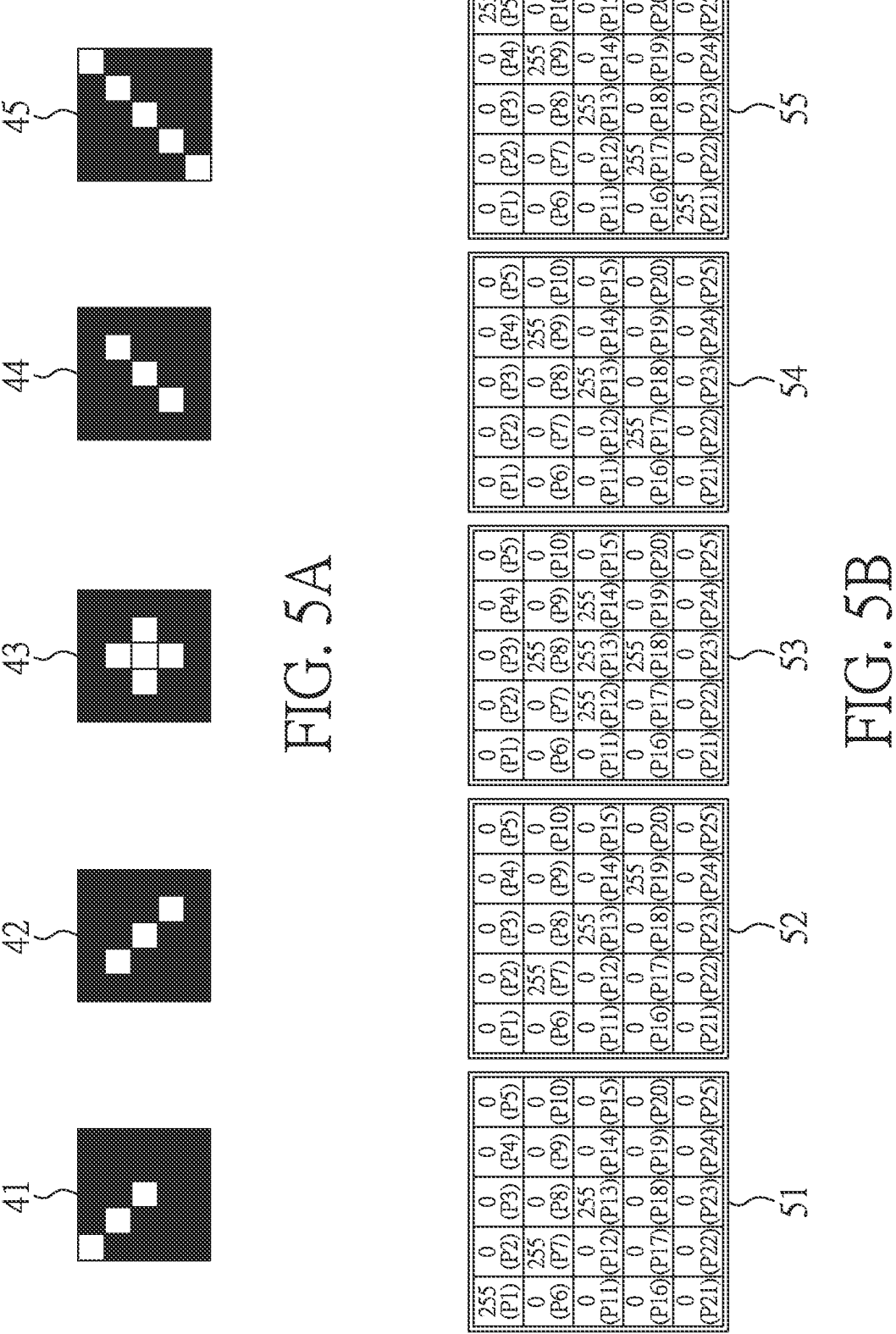
FIG. 5A is a schematic diagram of first original image to fifth original image according to an embodiment of the present disclosure.
FIG. 5B schematically illustrates gray scale value distribution data of the first original image to the fifth original image of FIG. 5A.

Next, the details of step S41 will be described. As shown in FIG. 1, FIG. 5A and FIG. 5B, the first original image 41 to the fifth original image 45 are the images captured by the image acquiring device 10 at the same position but at different focuses, in other words, at different positions in the Z direction. The first original image 41 has a plurality of first sub-images, the second original image 42 has a plurality of second sub-images, the third original image 43 has a plurality of third sub-images, and the fourth original image 44 has a plurality of fourth sub-images, the fifth original image 45 has a plurality of fifth sub-images. Each sub-image corresponds to one of the pixel positions P1~P25, and the pixel positions P1~P25 of the first original image 41 to the fifth original image 45 correspond to each other. Each sub-image has a gray scale value; that is, each pixel position P1~P25 may correspond to a gray scale value. In one embodiment, the gray scale value may be between 0 and 255 (for example, 0≤gray scale value≤255), but it is not limited thereto.

In one embodiment, after the processing device 30 acquires the first original image 41 to the fifth original image 45, based on the gray scale value corresponding to each pixel position P1~P25 of the first original image data to the fifth image data, the processing device 30 may generate the first gray scale value distribution data 51 to the fifth gray scale value distribution data 55, as shown in FIG. 5B. In different images from the first original image 41 to the fifth original image 45, each corresponding pixel position P1~P25 may correspond to a different gray scale value. For example, the gray scale value of the first sub-image corresponding to the pixel position P1 in the first gray scale value distribution data 51 is 255, and the gray scale values of the second sub-image to the fifth sub-image corresponding to the pixel position P1 in the second gray scale value distribution data 52 to the fifth gray scale value distribution data 55 are all 0, and so on. The statement "gray scale value being 0" may be regarded as the darkest brightness or the lowest definition, and the term "gray scale value being 255" may be regarded as the brightest brightness or highest definition, but the present disclosure is not limited thereto.

As a result, step S41 may be understood.

Next, the details of step S42 will be described. In this step, the processing device 30 calculates the relative change of the gray scale values corresponding to each pixel position P1~P25 and the surrounding pixel positions of each gray scale value distribution data 51~55, so as to acquire the gray scale value change rate for each pixel position P1~P25. In the present disclosure, the larger the "gray scale value change rate" is, the clearer the image at the pixel position is. Next, it will be described in detail with reference to FIG. 6, in which the first gray scale value distribution data 51 is taken as an example, and so on.

In one embodiment, the processing device 30 may use a specific range to calculate the relative change of the gray scale values corresponding to each pixel position P1~P25 and the surrounding pixel positions, for example, using a convolution window. In one embodiment, the convolution window may be, for example, a Kernel window, but it is not limited thereto. In one embodiment, the size of the convolution window may be M by N sub-pixels, where M and N are positive integers. The embodiment of FIG. 6 takes M as 3 and N as 3 as an example. In other words, the size of the convolution window may be 3 by 3 sub-pixels, and each pixel position will be disposed at the center of the window for calculating the relative change of the gray scale values corresponding to the centered position and the 8 pixel positions around it. For example, the pixel position P13 of the first gray scale value distribution data 51 is used with the pixel positions P7, P8, P9, P12, P14, P17, P18 and P19 to calculate the relative change of the gray scale values, so as to acquire the gray scale value change rate of the pixel position P13.

In addition, in one embodiment, when the pixel position to be calculated is disposed at the edge of the image, such as pixel positions P1~P5, P6, P10, P11, P15, P16, P20, P21~P25, etc., there may be virtual pixel positions existed in the convolution window. For example, in the convolution window of pixel position P1, the lower left, left, upper left, right upper and upper right of the pixel position P1 may be the virtual pixel positions, and so on. In one embodiment, the processing device 30 may fill in the gray scale value to the virtual pixel position. Taking the convolution window of the pixel position P1 in FIG. 6 as an example, the processing device 30 may use the gray scale values corresponding to the pixel positions P1, P2, P6 and P7 to fill in gray scale values to the adjacent virtual pixel positions. For example, the gray scale value corresponding to pixel position P1 is 255 so that the virtual pixel positions on the left, upper left and upper side of the pixel position P1 will be filled with gray scale values of 255, the gray scale value corresponding to the pixel position P2 is 0 so that the virtual pixel position above the pixel position P2 will be filled with the gray scale value of 0, and so on. In another embodiment, the processing device 30 may also directly fill in the same preset gray scale value, such as 0 or 255, to all the virtual pixel positions, while it is not limited thereto.

In one embodiment, the type of gray scale value change rate may include average value change rate, standard deviation change rate, and root mean square change rate, but it is not limited thereto. In the following, the gray scale value change rate is used as an example to illustrate the average change rate. In one embodiment, the calculation of the gray scale value change rate may be expressed as equation (1), as follows:

$$F_{var} = \frac{1}{MN} \sum_{j=1}^{M} \sum_{i=1}^{N} [g(i, j) - \bar{g}]^2, \qquad \text{equation (1)}$$

wherein $F_{var}$ is the gray scale value change rate of one of the pixel positions, M and N are the size of the convolution window, g(i,j) is the gray scale value corresponding to each pixel position or virtual pixel position in the current convolution window, $\bar{g}$ is the average value of the gray scale values corresponding to all pixel positions in the current convolution window, and i and j are used to indicate each pixel position in the current convolution window, where i and j are each an integer of 1~3. Taking the convolution window of pixel position P1 as an example to calculate the gray scale value change rate $F_{var}$ of P1, g(1,1) is the virtual pixel position at the upper left of pixel position P1, and g(3,3) is the pixel position at the lower right of the pixel position P1, and so on.

Through step S42, the processing device 30 may generate the gray scale value change rates corresponding to the first original image 41 to the fifth original image 45, which are respectively represented by first image data 61 to fifth image data 65, as shown in FIG. 7A. Accordingly, step S42 can be understood.

Next, the details of step S43 will be described.

As shown in FIG. 7A and FIG. 7B, the processing device 30 may set an index for each of the first image data 61 to the fifth image data 65 in advance; for example, the index of the first image data 61 is 0 (index=0), the index of the second image data 62 is 1 (index=1), the index of the third image data 63 is 2 (index=2), the index of the fourth image data 64 is 3 (index=3), and the index of the fifth image data 65 is 4 (index=4). After the processing device 30 generates the first image data 61 to the fifth image data 65, for each corresponding pixel position P1~P25, the processing device 30 may select the maximum value among the gray scale value change rates corresponding to the pixel positions P1~P25 from the first sub-image data of the first image data 61 to the fifth sub-image data of the fifth image data 65 for use as the combination sub-image data in the combination image data 70 that corresponds to the pixel positions P1~P25. For example, for the pixel position P1, the gray scale value change rate corresponding to the pixel position P1 of the first image data 61 is 16056, which is the maximum value of the gray scale value change rates at the corresponding pixel position P1 of the first sub-image data of the first image data 61 to the fifth sub-image data of the fifth image data 65, so that the processing device 30 will set the pixel position P1 of the combination image data 70 to 16056, and record the combination sub-image data corresponding to the pixel position P1 in the combination image data 70 being originated from the first image data 61. For example, the corresponding pixel position P1 of the combination image data 70 is marked as 0, indicating that it originates from the first image data 61 with an index of 0, so as to generate the index sub-data corresponding to the pixel position P1. In another example, among the pixel positions P13 corresponding to the first image data 61 to the fifth image data 65, the pixel position P13 corresponding to the third image data 63 has the largest gray scale value change rate of 16056, so that the processing device 30 will set the combination sub-image data 70 corresponding to the pixel position P13 of the combination image data 70 to 16056, and record the corresponding pixel position P13 of the combination image data 70 being originated from the third image data 63. For example, the corresponding pixel position P13 of the combination image data 70 is marked as 2, indicating that it originates from the third image data 63 with an index of 2, so as to generate an index sub-data corresponding to pixel position P13, and so on. Afterwards, the processing device 30 may generate index data 75 (shown in FIG. 7B) according to the index sub-data corresponding to each pixel position P1~P25.

Since the first image data 61 originates from the first original image 41, the second image data 62 originates from the second original image 42, the third image data 63 originates from the third original image 43, the fourth image data 64 originates from the fourth original image 44 and the fifth image data 65 originates from the fifth original image 45, the first original image 41 to the fifth original image 45 are also applicable to the indexes (index=0~4). Therefore, the processing device 30 may find the source of each corresponding pixel position P1~P25 of the combination image data 70 according to the index data 75 (such as the sub-image data in the first image data 61 to the fifth image data 65), and then use the source to acquire the sub-images in the first original image 41 to the fifth original image 45.

Accordingly, step S43 can be understood.

Next, step S44 will be described. As shown in FIG. 8, the processing device 30 may convert each corresponding pixel position P1~P25 of the combination image data 70 into gray scale value according to the index data 75. That is, the combination sub-image data of each pixel position P1~P25 is converted into a sub-image of one of the first original image 41 to the fifth original image 45 so as to generate an updated sub-image for each pixel position P1~P25 to correspond to a gray scale value, thereby generating an updated image 80. For example, the index sub-data of the index data 75 corresponding to the pixel position P1 is marked as 0, indicating that the combination sub-image data corresponding to the pixel position P1 originates from the first original image 41, and the processing device 30 may convert the combination sub-image data corresponding to the pixel position P1 of the combination image data 70 into the gray scale value corresponding to the pixel position P1 of the first original image 41 (for example, 255) (the updated sub-image corresponding to the pixel position P1 in the update image 80 is the sub-image corresponding to the pixel position P1 of the first original image 41, i.e., having the same gray scale value). In another example, the corresponding pixel position 13 of the index data 75 is marked as originating from the third original image 43, and thus the processing device 30 may convert the combination sub-image data corresponding to the pixel position P13 of the combination image data 70 into the gray scale value corresponding to the pixel position P13 of the third original image 43 (for example, 255) (the updated sub-image corresponding to the pixel position P13 in the update image 80 is the sub-image corresponding to the pixel position P13 of the third original image 43, i.e., having the same gray scale value), and so on. Accordingly, the updated image 80 can be generated. Since the updated sub-image of each corresponding pixel position P1~P25 in the updated image 80 is the clearer one among the first original image 41 to the fifth original image 45, the updated image 80 may present a clearer picture.

Accordingly, step S44 can be understood.

Next, step S441 will be described, and please refer to FIG. 7B and FIG. 9 at the same time. FIG. 9 schematically illustrates a de-noising procedure according to an embodiment of the present disclosure.

As shown in FIG. 7B and FIG. 9, in one embodiment, the processing device 30 may further perform a low-pass filtering procedure on the combination image data 70. For example, the gray scale value change rate corresponding to each pixel position P1~P25 of the combination image data 70 is compared with a threshold value (for example, the threshold value is 6422), and the pixel positions with gray scale value change rate smaller than or equal to the threshold value (such as P3, P11, P15, P20, P23, P24 and P25) are recorded, so that the recorded pixel positions (such as P3, P11, P15, P20, P23, P24 and P25) are marked as the same value in the index data 75, for example, all marked as the same index (for example, all marked as the median of 2 of the indexes 0~4 or all marked as 0, but not limited thereto), thereby forming an updated index data 77, while it is not limited thereto. As a result, the updated sub-image in the updated image 80 that corresponds to the pixel position with lower definition (which may be regarded as noise) will be replaced, for example, with a gray scale value of 0, but it is not limited thereto.

In one embodiment, the present disclosure may at least compare the operation of an object through mechanism observation, such as using the operational relationship between components as evidence of whether the operation of the object falls within the scope of patent protection of the present disclosure, or the operation logic of the object may be analyzed by means of reverse engineering, while it is not limited thereto.

As a result, the present disclosure may provide a complete and clear image frame, so as to solve the problems of the prior art.

The details or features of the various embodiments in the present disclosure may be mixed and matched arbitrarily as long as they do not violate the spirit of the disclosure or conflict with each other.

The aforementioned specific embodiments should be construed as merely illustrative, and not limiting the rest of the present disclosure in any way.

The invention claimed is:

1. A method for acquiring an image using an image acquiring system, comprising the steps of:

in a first direction of the image acquiring system, acquiring a first image data at a first position, wherein the first image data includes a plurality of first sub-image data, and each of the first sub-image data corresponds to one of a plurality of pixel positions;

in the first direction of the image acquiring system, acquiring a second image data at a second position, wherein the second image data includes a plurality of second sub-image data, and each of the second sub-image data corresponds to one of the plurality of pixel positions; and selecting a larger value among values of the first sub-image data and the second sub-image data corresponding to one of the plurality of pixel positions as a combination sub-image data in a combination image data;

wherein the first image data originates from a first original image acquired at the first position, and the second image data originates from a second original image acquired at the second position;

wherein the first original image and the second original image corresponds to a plurality of pixel positions, and a gray scale value change rate for each pixel position is acquired by calculating relative change of the gray scale values corresponding to each pixel position and surrounding pixel positions;

wherein the gray scale value change rate for each pixel position is acquired by using a convolution window to calculate the relative change of the gray scale values corresponding to each pixel position and surrounding pixel positions, and when there is at least one virtual pixel position in the convolution window, and the virtual pixel position is filled with a gray scale value.

2. The method as claimed in claim 1, wherein the value includes a gray scale value change rate.

3. The method as claimed in claim 2, wherein the gray scale value change rate is an average change rate.

4. The method as claimed in claim 2, wherein the gray scale value change rate is a standard deviation change rate.

5. The method as claimed in claim 2, wherein the gray scale value change rate is a root mean square change rate.

6. The method as claimed in claim 1, further comprising the step of: converting the combination sub-image data into an updated sub-image, wherein the updated sub-image corresponds to one of the plurality of pixel positions and has a gray scale value.

7. The method as claimed in claim 1, further comprising the step of: performing a low-pass filtering procedure on the combination image data.

8. The method as claimed in claim 7, further comprising the step of: converting the combination sub-image data into an updated sub-image, wherein the updated sub-image corresponds to one of the plurality of pixel positions and has a gray scale value.

9. The method as claimed in claim 1, wherein the first position is different from the second position in the first direction.

10. The method as claimed in claim 1, further comprising the step of: generating an index sub-data according to the gray scale value change rates of the first sub-image data and the second sub-image data corresponding to one of the plurality of pixel positions, and converting the combination sub-image data into an updated sub-image according to the index sub-data.

11. The method as claimed in claim 9, wherein according to the gray scale value corresponding to each pixel position of the first original image, first gray scale value distribution data is generated, and wherein according to the gray scale value corresponding to each pixel position of the second original image, second gray scale value distribution data is generated.

12. The method as claimed in claim 11, wherein the first gray scale value distribution data corresponds to a plurality of pixel positions, the second gray scale value distribution data corresponds to a plurality of pixel positions.

13. The method as claimed in claim 12, wherein the gray scale value change rate for each pixel position is acquired by using a specific range to calculate the relative change of the gray scale values corresponding to each pixel position and surrounding pixel positions.

14. The method as claimed in claim 12, wherein the convolution window has a size of M by N sub-pixels, wherein M and N are each a positive integer, and the each pixel position is disposed at the center of the convolution.

15. The method as claimed in claim 1, wherein the image acquiring system comprises an image acquiring device including a camera module, a lens and a first shifter, and the camera module is aligned with the lens in the first direction, and captures an image of an object below the lens through the lens.

16. The method as claimed in claim 15, wherein the first shifter drives the camera module and the lens to move in the first direction, thereby adjusting the focus of the image acquiring device.

17. The method as claimed in claim 15, wherein the image acquiring system further comprises a moving device including a stage, a second shifter, a third shifter, and a backlight disposed on the stage in the first direction.

18. The method as claimed in claim 17, wherein the second shifter and the third shifter drive the stage to move in a first horizontal direction and a second horizontal direction, respectively.

* * * * *